United States Patent [19]
Mattson

[11] 3,970,416
[45] July 20, 1976

[54] REINFORCED MEMBRANE
[75] Inventor: William F. Mattson, Hinckley, Ohio
[73] Assignee: The B. F. Goodrich Company, Akron, Ohio
[22] Filed: July 14, 1975
[21] Appl. No.: 595,880

[52] U.S. Cl. .................................................. 425/52
[51] Int. Cl. ............................................. B29h 5/18
[58] Field of Search ................. 425/49, 50, 51, 52, 425/53

[56] References Cited
UNITED STATES PATENTS

| | | | |
|---|---|---|---|
| 1,642,541 | 9/1927 | Ellinwood | 425/52 X |
| 2,452,821 | 1/1948 | Wood | 425/812 |
| 2,695,424 | 1/1954 | Madison et al. | 425/53 |
| 2,851,729 | 9/1958 | Kalkofen | 425/53 |
| 3,170,195 | 2/1965 | Knox | 425/51 |
| 3,676,028 | 7/1972 | Christie et al. | 425/52 X |

FOREIGN PATENTS OR APPLICATIONS 938,797  10/1963  United Kingdom ................... 425/53

*Primary Examiner*—J. Howard Flint, Jr.
*Attorney, Agent, or Firm*—Harry F. Pepper, Jr.; W. A. Shira, Jr.

[57] ABSTRACT

A tire curing membrane has a pattern of interconnected ribs integrally molded on its inside surface. The ribs collectively define a pattern of closely fitted, approximately equilateral hexagons with no non-hexagonal interstices.

8 Claims, 3 Drawing Figures

REINFORCED MEMBRANE

BACKGROUND OF THE INVENTION

This invention relates to vulcanization devices and more particularly to elastomeric vulcanization membranes.

During vulcanization of many elastomeric articles in a mold a device referred to generally as a vulcanizing or curing membrane is used to force the elastomeric article firmly against the mold. In the manufacture of pneumatic tires, for example, a curing membrane seats the uncured tire in the vulcanization mold and retains it until properly cured. Hot fluid such as steam or extremely hot water is circulated within the membrane during the curing process. Heat is transferred from the hot fluid through the membrane to the tire, thereby effecting a vulcanization.

Curing membranes, particularly those used in the vulcanization of pneumatic tires, are often referred to as "bladders" or "water bags". The chief distinction between bladders and water bags or bags is that the former are generally much thinner and are designed to be much more expansible.

Although water bags may contain a fluid under high pressure, they rarely are designed to expand beyond about 5%, whereas a bladder can be stretched up to about 100% circumferentially and up to about 20% laterally or radially. To accomodate expansions, curing membranes are commonly made of some type of elastomeric material. The elastomeric material must be strong enough to withstand repeated pressurizations, expansions and contractions without splitting or otherwise deteriorating.

The cure time of a tire will vary with thickness of the membrane, among other factors. Since elastomeric materials are a relatively poor conductor of heat, a slight difference in the thickness of a membrane can mean a substantial difference in cure time of a tire. In order to reduce the cure time, attempts have been made to reduce membrane thickness. A buckling problem emerges when the membrane thickness is reduced below a minimum point.

Buckling of a tire curing membrane, particularly a bladder is primarily due to the frictional sliding forces between the membrane and the uncured tire as the membrane expands and forces the tire against the mold. Many of these forces are applied to the membrane at a portion associated with the bead area of the uncured tire.

Reducing the thickness of a membrane reduces its strength. Below a given thickness, portions of the membrane cannot carry the stress applied to them, causing erratic expansion and possibly causing portions of the membrane to buckle or crease. This can result in an uneven heat distribution to the tire and thus in a non-uniform cure.

In an attempt to decrease the thickness of a curing membrane while still retaining sufficient strength, specially designed reinforcements can be employed. For example, U.S. Pat. No. 2,695,424 discloses a thin walled curing bag with ribs on its inside surface. In membranes such as disclosed in U.S. Pat. No. 2,695,424, the curing time can allegedly be reduced because of the thinner bag, while the ribs supply the strength that was lost by decreasing the bag thickness. Unfortunately, since the ribs of a curing bag of the type disclosed in U.S. Pat. No. 2,695,424 work essentially independent of each other, a bladder with such a ribbed design can still buckle or kink due to the more extreme expansion of a bladder. A bag of the type mentioned above expands very little compared to a bladder and therefore stress levels are much lower.

To avoid the aforementioned buckling problems, it is desirable to create a membrane with stress carrying capabilities equal in all directions. Some attempts at reinforced curing membranes have employed rectangular rib patterns such as disclosed in U.S. Pat. No. 2,695,424. It can be seen that such a rectangular rib pattern has maximum stress carrying capabilities only in the two directions parallel to the ribs.

Uniform stress carrying characteristics can best be achieved by a ribbed pattern with ribs oriented in as many directions as practical. It may therefore be believed that a pattern of tightly packed circular ribs would be one of the more uniform in stress carrying capability. Circular ribs, however, cannot be arranged in a joined or interconnected manner without leaving non-circular interstices which can create variations in stress carrying characteristics and, even more important, variations in heat transfer through the membrane.

SUMMARY OF THE INVENTION

It is an object of the present invention to provide an elastomeric curing membrane which resists buckling or kinking.

It is a further object of the present invention to provide an elastomeric curing membrane that has an increased life.

It is a further object of the present invention to provide an elastomeric curing membrane that resists buckling or kinking and decreases curing time.

These and other objects of the present invention which will become evident by the following detailed description are achieved by a curing membrane comprising a membrane wall and a plurality of interconnected ribs integrally molded on the inside surface of the wall. Collectively, the ribs form a plurality of adjoining hexagons, with each rib being a common side of two adjoining hexagons. To give the most uniform stress carrying capabilities, each hexagon approaches an equilateral and equiangular hexagon.

DETAILED DESCRIPTION OF A PREFERRED EMBODIMENT

Figure 1:
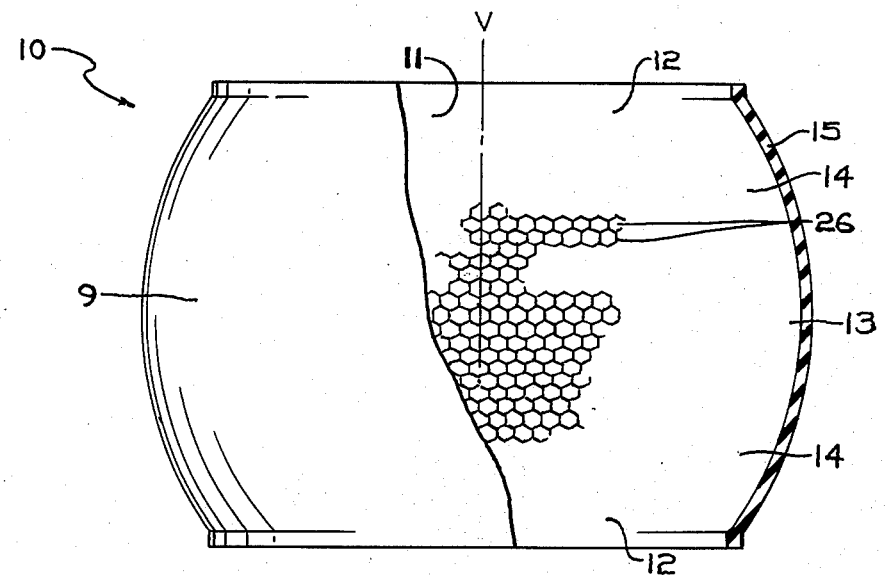
FIG. 1 is a fragmented side elevation of a tire curing membrane of the present invention.

Referring to FIG. 1, a tire curing membrane of the present invention is shown as a bladder 10. The bladder 10 is hollow and has a generally barrel shape. It is formed of a typical high strength elastomeric material such as butyl compound or other similar substance. The bladder 10 is basically comprised of a bladder wall 15 having two end or "bead" portions 12, a middle or "crown" portion 13, and two intermediate or "sidewall" portions 14. The bladder 10 is symmetrically formed about an axis V. When an uncured tire (not shown) is fitted over the outside surface 9 of the bladder 10 and the bladder is subsequently expanded, portions of the outside surface 9 expand into direct contact with portions of the uncured tire thereby forcing it against the inner surface of a tire mold (not shown).

Figure 2:
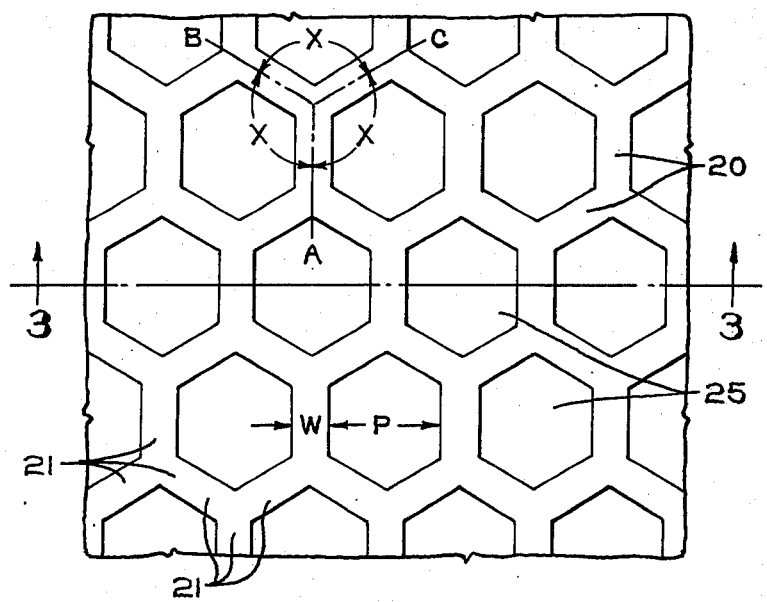
FIG. 2 is an enlarged view of a portion of the inside surface of the membrane of FIG. 1; and, FIG. 3 is a cross section of the membrane taken along line 3—3 of FIG. 2.
Figure 3:
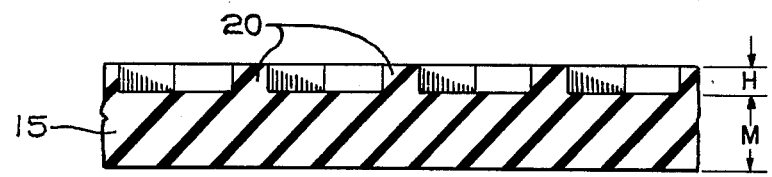

As is more readily seen in FIGS. 2 and 3, a plurality of interconnected ribs 20 are integrally molded on the inside surface 11 of the bladder 10. The interconnected ribs 20 form several groups 21 of three adjoining ribs, each of the groups 21 being adjoined with other groups 21 by a common rib 20. Collectively, the interconnected ribs 20, or the several groups 21 of adjoining ribs, define a plurality of hexagons 25.

Each group 21 of three adjoining ribs can be considered as having three axes, A, B and C, the angle X between each adjacent pair of axes being 120°. Each of the three ribs 20 of each group 21 is oriented substantially parallel to one of the three axes A, B or C. The hexagons 25 formed by the ribs 20 are therefore substantially equilateral and equiangular, and are tightly fitted together, i.e., the rib widths W are equal and the pattern has no non-hexagonal interstices. In this tightly fitted pattern of hexagons 25, each rib 20 is a common side of two adjacent hexagons 25.

To create desirable stress carrying capabilities over the entire surface of the bladder 10, the widths W of each rib 20 are essentially equal. A preferable rib width W is about one-third of the perpendicular distance P between the parallel ribs of a hexagon 25 near the crown portion 13 of the bladder 10. It will be seen that in some situations the hexagons will vary in size from the crown portion 13 of the bladder 10 to the bead portions 12, thus making it impossible to have both equal rib widths W and equal distances P between parallel ribs.

Preferably, one rib axis such as A is parallel to the axis V of the bladder 10. The ribs 20 parallel to this axis A carry stresses applied to the bladder 10 in a radial direction. Ribs 20 parallel to the other two axes B and C will carry stresses which are partly circumferential and partly radial.

In this preferred configuration, there are several circumferential rows or rings 26 of hexagons 25 covering the bladder 10. Because each hexagon 25 is formed of ribs 20 which can be common to an adjacent hexagon 25 in another circumferential row 26, it is clear that each circumferential row or ring 26 of the hexagons 25 has an equal number of hexagons 25. The circumference of the bladder 10 is largest at the crown portion 13 thereby making the hexagons 25 near the crown portion 13 larger than the hexagons 25 near the bead portions 12. Keeping the rib widths W of each rib 20 equal to facilitate optimum stress characteristics, there is a very gradual decrease in length of the ribs 20 and thus the size of each hexagon 25 of adjacent rows or rings 26 moving from the crown portion 13 to the bead portions 12.

This variation in hexagon size is quite acceptable. Buckling or kinking of the bladder 10 has most frequently occurred in the bead portions 12. If the rib width W is kept constant as the size of the hexagons 25 decreases, more of a ribbed area will exist at the bead portions 12, thereby permitting the bead regions to withstand the higher buckling stresses existent there. Furthermore, a greater nonribbed area in the crown portion 13 permits maximum expansion of the bladder 10 in the crown region where it is required. This maximum expansion will cause the wall 15 to be thinnest in the crown portion 13, permitting a more rapid heat transfer. Bacause the crown or tread portion of the tire is one of its thickest regions, more heat is desirable there to effect a uniform cure of the tire.

Essentially all of the heat that effects a cure of the tire from the inside passes through the bladder 10 via the nonribbed area. Using narrow ribs 25, heat is more readily passed to areas of the associated tire directly beneath the ribbed areas thereby effecting a more rapid and uniform cure. It is therefore preferred that the bladder 10 comprises a relatively large number of narrow ribs 25 rather than a lesser number of wider ribs giving equivalent strength. Although the percentage of nonribbed area is different at each portion of the bladder 10, overall about 60% of the total area of the inside surface 11 of the bladder is nonribbed. Preferably, the height H of each rib 25 is from about 35% to 40% of the thickness M of the wall 15.

There will be a gradual decrease in the length of ribs 25 moving from the crown portions 13 of the bladder 10 to the bead portions 12. Therefore, by keeping the width W of each rib 25 constant, the angle X between each two adjoining ribs 25 will vary minutely from 120°. It should be noted that while the length of a rib 25 near the crown portion 13 of the bladder 10 may be substantially different from the length of a rib in a bead portion 12, the angles X of all hexagons will remain relatively close to 120°.

It should be noted that the use of a hexagonal pattern is essential. As previously discussed, for uniform stress carrying capabilities, it is desirable to have interconnected ribs oriented in as many directions as possible. Because a circular ribbed pattern creates the aforementioned problem of small interstices between ribs, it is preferred to use a pattern of ribs that tightly fit together giving a maximum nonribbed area. The hexagonal pattern is the largest equilateral and equiangular polygonal pattern that can be tightly fitted together without leaving interstices as described hereinbefore.

Structural reinforcement on the inside surface 11 of the bladder 10 leaves the outside surface 9 essentially smooth, thereby leaving no undesired marks or patterns on the inside of the tire. Nevertheless, additional patterns or structure may be molded to the outside surface 9 without affecting the usefulness of the inside structure of this invention. For example, air venting or bleeding channels as disclosed in U.S. Pat. No. 3,143,155 may be used.

Another feature of a pattern of close ribs on the inside surface of the bladder 10 is increased heat transfer through the bladder. It is believed that the ribs cause sufficient turbulance of the heating medium, for example, flowing water, to break up a portion of the thermal boundary layer between the inside surface 11 of the bladder and the heating medium, thus more readily permitting heat to pass through the bladder 10.

Although the foregoing structure was described for the purpose of illustrating a presently preferred embodiment of the invention, it should be understood that many modifications or alterations may be made without departing from the spirit and scope of the invention as set forth in the appended claims.

I claim:

1. A curing membrane comprising:
   a. a wall having an inside surface, and
   b. a plurality of groups of adjoining ribs integrally molded to the inside surface of the wall wherein:
      1. the groups of ribs collectively form a plurality of adjoining hexagons, and 2. each rib is a common side of two adjacent hexagons.

2. A curing membrane as defined in claim 1 wherein the width of each rib is essentially equal.

3. A curing membrane as defined in claim 1 wherein the width of each rib is approximately one-third of the perpendicular distance between the ribs of each hexagon.

4. A curing membrane as defined in claim 1 wherein the ribs of each hexagon are substantially equal in length.

5. A curing membrane as defined in claim 1 wherein the angle between each two adjoining ribs is substantially 120°.

6. A curing membrane as defined in claim 1 wherein the height of each rib is from about 35% to 40% of the thickness of the wall.

7. A curing membrane as defined in claim 1 wherein the nonribbed area of the inside surface is about 60% of the total area of the inside surface of the membrane.

8. A curing membrane as defined in claim 1 wherein the plurality of adjacent hexagons extends essentially over the entire inside surface of the wall.

* * * * *